United States Patent
Miyake et al.

(10) Patent No.: US 11,279,419 B2
(45) Date of Patent: Mar. 22, 2022

(54) MEMBER FOR AUTOMOBILE ROOF AND METHOD FOR PRODUCING MEMBER FOR AUTOMOBILE ROOF

(71) Applicants: Sumitomo Chemical Company, Limited, Tokyo (JP); Toyota Jidosha Kabushiki Kaisha, Toyota (JP)

(72) Inventors: Yuichi Miyake, Nagoya (JP); Toshio Watanabe, Toyota (JP); Wataru Tokuhara, Nagoya (JP); Minako Izumi, Toyota (JP); Shunsuke Chiba, Ichihara (JP)

(73) Assignees: Sumitomo Chemical Company, Limited, Tokyo (JP); Toyota Jidosha Kabushiki Kaisha, Tokyo (JP)

( * ) Notice: Subject to any disclaimer, the term of this patent is extended or adjusted under 35 U.S.C. 154(b) by 40 days.

(21) Appl. No.: 16/805,991

(22) Filed: Mar. 2, 2020

(65) Prior Publication Data
US 2020/0307719 A1    Oct. 1, 2020

(30) Foreign Application Priority Data
Mar. 29, 2019    (JP) .............................. JP2019-066437

(51) Int. Cl.
    *B62D 29/04*    (2006.01)
    *B32B 27/08*    (2006.01)
    (Continued)

(52) U.S. Cl.
    CPC .............. *B62D 29/043* (2013.01); *B32B 7/02* (2013.01); *B32B 27/08* (2013.01); *B32B 27/20* (2013.01);
    (Continued)

(58) Field of Classification Search
    CPC ..... B32B 27/00–27/42; B32B 2250/03; B62D 29/00–29/048; B62D 25/00–25/24; C08L 33/12; C08L 23/00–23/36
    See application file for complete search history.

(56) References Cited

U.S. PATENT DOCUMENTS

2017/0144417 A1    5/2017    Matsui et al.
2020/0376820 A1*   12/2020   Kitade ................... B32B 7/022

FOREIGN PATENT DOCUMENTS

JP    61-176617 A    8/1986
JP    61-179210 A    8/1986
(Continued)

OTHER PUBLICATIONS

Kakugo et al., Macromolecues, 1982, 15, 1150-1152.

*Primary Examiner* — Prashant J Khatri
(74) *Attorney, Agent, or Firm* — Finnegan, Henderson, Farabow, Garrett & Dunner LLP

(57) ABSTRACT

The present invention relates to a member for an automobile roof provided by compression molding a laminate, wherein the laminate comprises three layers: a layer A-a, a layer B, and a layer A-b laminated in the order mentioned, when the sum of the thickness of the layer A-a, the layer B and the layer A-b is assumed to correspond to 100%, the sum of the thickness of the layer A-a and the layer A-b accounts for from 6 to 8%, and the thickness of the layer A-a accounts for from 0.5 to 7.5%, the thickness of the layer A-b accounts for from 0.5 to 7.5%, and the thickness of the layer B accounts for from 92 to 94%, in such a way that the sum of the thickness of the layer A-a, the layer B and the layer A-b accounts for from 70 to 93%.

2 Claims, 1 Drawing Sheet

(51) Int. Cl.
    *B32B 27/32*           (2006.01)
    *B32B 27/20*           (2006.01)
    *B62D 25/06*           (2006.01)
    *B32B 7/02*             (2019.01)
    *B29K 23/00*           (2006.01)
    *B29L 31/30*           (2006.01)
    *B29C 43/20*           (2006.01)

(52) U.S. Cl.
    CPC .............. *B32B 27/32* (2013.01); *B62D 25/06* (2013.01); *B29C 43/203* (2013.01); *B29K 2023/12* (2013.01); *B29L 2031/30* (2013.01); *B32B 2250/242* (2013.01); *B32B 2250/40* (2013.01); *B32B 2605/00* (2013.01)

(56) References Cited

FOREIGN PATENT DOCUMENTS

| | | |
|---|---|---|
| JP | 3-263412 A | 11/1991 |
| JP | 6-16726 A | 1/1994 |
| JP | 4335073 B2 | 9/2009 |
| JP | 5302534 B2 | 10/2013 |
| JP | 2015 096586 A | 5/2015 |
| JP | 6191762 B2 | 8/2017 |
| JP | 2017-186561 A | 10/2017 |
| WO | WO 2015/152389 A1 | 10/2015 |

\* cited by examiner

MEMBER FOR AUTOMOBILE ROOF AND METHOD FOR PRODUCING MEMBER FOR AUTOMOBILE ROOF

TECHNICAL FIELD

The present invention relates to a member for an automobile roof and a method for producing a member for an automobile roof.

BACKGROUND

Laminated flat plates containing a propylene polymer have been used in various industrial parts such as automobile interior and exterior parts and parts of home electric appliances because they are very inexpensive and lightweight.

As one of methods for producing a laminated flat plate containing a propylene polymer, a compression molding method is known. The compression molding method is a method that can improve the impact resistance of laminated flat plates.

For example, Patent Literature 1 describes a formed article obtained by compression molding a laminate for compression molding.

CITATION LIST

Patent Literature

Patent Literature 1: Japanese Patent No. 6191762

SUMMARY

Exterior materials for automobiles such as members for an automobile roof are required to have excellent coatability. It is thus an object of the present invention to provide a member for an automobile roof excellent in coatability and a method for producing a member for an automobile roof.

The present invention relates to a member for an automobile roof provided by compression molding a laminate, wherein the laminate comprises three layers: the following layer A-a, the following layer B, and the following layer A-b laminated in the order mentioned, when the sum of the thickness of the layer A-a, the thickness of the layer B, and the thickness of the layer A-b is assumed to correspond to 100%, the sum of the thickness of the layer A-a and the thickness of the layer A-b accounts for 6% or more and 8% or less, and the thickness of the layer A-a accounts for 0.5% or more and 7.5% or less, the thickness of the layer A-b accounts for 0.5% or more and 7.5% or less, and the thickness of the layer B accounts for 92% or more and 94% or less, in such a way that the sum of the thickness of the layer A-a, the thickness of the layer B, and the thickness of the layer A-b accounts for 70% or more and 93% or less:

Layer A-a and layer A-b: layers comprising the following propylene polymer component (A1), the following ethylene-methyl methacrylate copolymer component (A2), and the following ethylene-(1-butene) copolymer component (A3), wherein, when the total content of the propylene polymer component (A1), the ethylene-methyl methacrylate copolymer component (A2), and the ethylene-(1-butene) copolymer component (A3) is assumed to be 100% by weight, the content of the propylene polymer component (A1) is 42.5% by weight or more and 47.5% by weight or less, the content of the ethylene-methyl methacrylate copolymer component (A2) is 32.5% by weight or more and 37.5% by weight or less, and the content of the ethylene-(1-butene) copolymer component (A3) is 15% by weight or more and 25% by weight or less;

Propylene polymer component (A1): a component as a propylene homopolymer having an isotactic structure, wherein the component has an isotactic pentad fraction of 0.90 or more and 0.99 or less, measured using 13C-NMR and a melt mass flow rate of 0.1 g/10 minutes or more and 5.0 g/10 minutes or less, measured under conditions of a temperature of 230° C. and a load of 2.16 kgf;

Ethylene-methyl methacrylate copolymer component (A2): an ethylene-methyl methacrylate copolymer component having a melt mass flow rate of 1.5 g/10 minutes or more and 5.0 g/10 minutes or less, measured under conditions of a temperature of 190° C. and a load of 2.16 kgf;

Ethylene-(1-butene) copolymer component (A3): an ethylene-(1-butene) copolymer component having a melt mass flow rate of 0.1 g/10 minutes or more and 1.0 g/10 minutes or less, measured under conditions of a temperature of 190° C. and a load of 2.16 kgf;

Layer B: a layer comprising the following propylene polymer component (B1) and the following talc (B2), wherein, when the total content of the propylene polymer component (B1) and the talc (B2) is assumed to be 100% by weight, the content of the propylene polymer component (B1) is 65% by weight or more and 75% by weight or less, and the content of the talc (B2) is 25% by weight or more and 35% by weight or less;

Propylene polymer component (B1): a component as a propylene homopolymer having an isotactic structure, wherein the component has an isotactic pentad fraction of 0.90 or more and 0.99 or less, measured using 13C-NMR and a melt mass flow rate of 0.1 g/10 minutes or more and 5.0 g/10 minutes or less, measured under conditions of a temperature of 230° C. and a load of 2.16 kgf;

Talc (B2): a talc satisfying the following requirement (1-a), the following requirement (1-b), and the following requirement (1-c);

Requirement (1-a): a talc having a median diameter D50(L) of 10 μm or more and 25 μm or less, measured by a laser diffraction method in accordance with JIS R1629;

Requirement (1-b): a talc having a median diameter D50(S) of 2 μm or more and 8 μm or less, measured by a centrifugal sedimentation method in accordance with KS R1619; and Requirement (1-c): a talc having an aspect ratio constant of 2 or more and 15 or less, determined by the following expression (1):

$$\text{Aspect ratio constant} = \{D50(L) - D50(S)\}/D50(S) \quad \text{Expression (1)}.$$

Such a member for an automobile roof has excellent coatability.

The present invention also relates to a method for producing a member for an automobile roof, comprising a step of compression molding a laminate, wherein the laminate comprises three layers: the layer A-a described above, the layer B described above, and the layer A-b described above laminated in the order mentioned, when the sum of the thickness of the layer A-a, the thickness of the layer B, and the thickness of the layer A-b is assumed to correspond to 100%, the sum of the thickness of the layer A-a and the thickness of the layer A-b accounts for 6% or more and 8% or less, and the thickness of the layer A-a accounts for 0.5% or more and 7.5% or less, the thickness of the layer A-b accounts for 0.5% or more and 7.5% or less, and the thickness of the layer B accounts for 92% or more and 94% or less, in such a way that the sum of the thickness of the layer A-a, the thickness of the layer B, and the thickness of the layer A-b accounts for 70% or more and 93% or less.

According to such a method, it is possible to produce a member for an automobile roof having excellent coatability.

According to the present invention, a member for an automobile roof having excellent coatability and a method for producing a member for an automobile roof are provided.

DETAILED DESCRIPTION

Hereinbelow, some embodiments of the present invention will be described in detail. However, the present invention is not intended to be limited to the following embodiments.

Figure 1A:
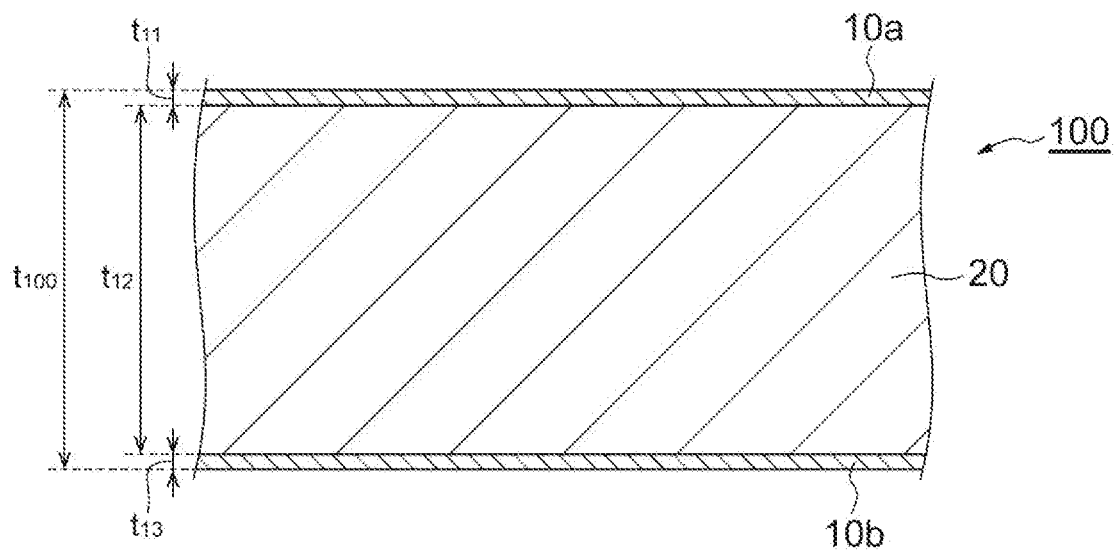
FIGS. 1A and 1B show a schematic cross-sectional view for illustrating an exemplary member for an automobile roof and an exemplary method for producing a member for an automobile roof of the present embodiment.
Figure 1B:
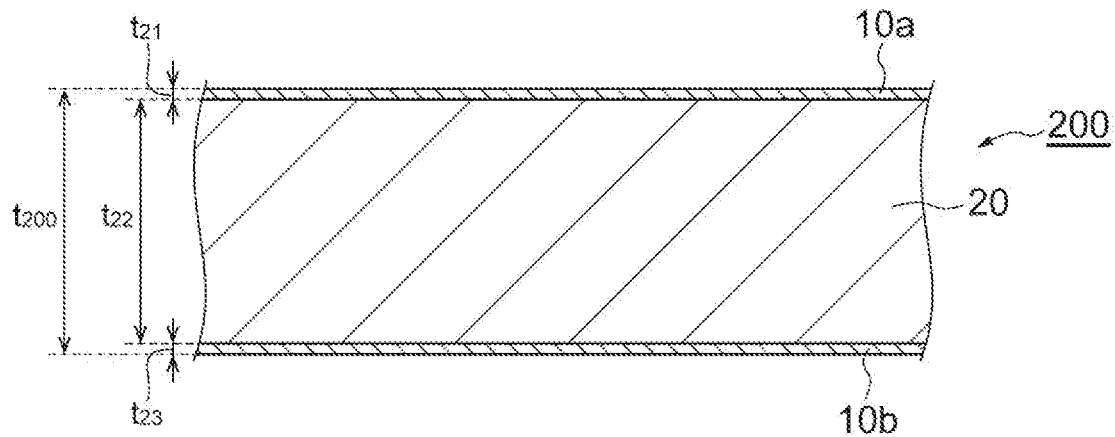

FIGS. 1A and 1B show a schematic cross-sectional view for illustrating an exemplary member for an automobile roof and an exemplary method for producing a member for an automobile roof of the present embodiment.

A member for an automobile roof 200 shown in FIG. 1B can be produced by compression molding a laminate 100 shown in FIG. 1A by thermally compressing the laminate 100 in the thickness direction of the laminate 100. That is, the member for an automobile roof 200 is provided by compression molding the laminate 100.

The laminate 100 comprises three layers: a layer A-a (10a), a layer B (20), and a layer A-b (10b) laminated in the order mentioned. When the sum of the thickness of the layer A-a (10a) $t_{11}$, the thickness of the layer B (20) $t_{12}$, and the thickness of the layer A-b (10b) $t_{13}$ (thickness $t_{100}$) is assumed to correspond to 100%, the sum of the thickness $t_{11}$ and the thickness $t_{13}$ accounts for 6% or more and 8% or less, the thickness $t_{11}$ accounts for 0.5% or more and 7.5% or less, the thickness $t_{13}$ accounts for 0.5% or more and 7.5% or less, and the thickness $t_{12}$ accounts for 92% or more and 94% or less. In the member for an automobile roof 200, the sum of the thickness of the layer A-a (10a) $t_{21}$, the thickness of the layer B (20) $t_{22}$, and the thickness of the layer A-b (10b) $t_{23}$ (thickness $t_{200}$) accounts for 70% or more and 93% or less of the thickness $t_{100}$ in the laminate 100.

Hereinbelow, the member for an automobile roof and the method for producing a member for an automobile roof of the present embodiment will be described further in detail.

The member for an automobile roof of the present embodiment is provided by compression molding a laminate, wherein the laminate comprises three layers: a layer A-a, a layer B, and a layer A-b laminated in the order mentioned, when the sum of the thickness of the layer A-a, the thickness of the layer B, and the thickness of the layer A-b is assumed to account for 100%, the sum of the thickness of the layer A-a and the thickness of the layer A-b accounts for 6% or more and 8% or less, and the thickness of the layer A-a accounts for 0.5% or more and 7.5% or less, the thickness of the layer A-b accounts for 0.5% or more and 7.5% or less, and the thickness of the layer B accounts for 92% or more and 94% or less (hereinbelow, also referred to as the "laminate for compression molding"), in such a way that the sum of the thickness of the layer A-a, the thickness of the layer B, and the thickness of the layer A-b accounts for 70% or more and 93% or less.

[Layer A-a and Layer A-b]

The layer A-a and the layer A-b are layers containing a propylene polymer component (A1) (hereinbelow, also referred to as the "component A1"), an ethylene-methyl methacrylate copolymer component (A2) (hereinbelow, also referred to as the "component A2"), and an ethylene-(1-butene) copolymer component (A3) (hereinbelow, also referred to as the "component A3"), wherein the total content of the component A1, the component A2, and the component A3 is assumed to be 100% by weight, the content of the component A1 is 42.5% by weight or more and 47.5% by weight or less, the content of the component A2 is 32.5% by weight or more and 37.5% by weight or less, and the content of the component A3 is 15% by weight or more and 25% by weight or less.

The component A1 is a component as a propylene homopolymer having an isotactic structure, wherein the component has an isotactic pentad fraction of 0.90 or more and 0.99 or less, measured using 13C-NMR (hereinbelow, also referred to as [mmmm]) and a melt mass flow rate of 0.1 g/10 minutes or more and 5.0 g/10 minutes or less, measured under conditions of a temperature of 230° C. and a load of 2.16 kgf. One component A1 may be used singly or two or more components A1 may be used in combination.

The melt mass flow rate herein refers to a value determined in accordance with HS K6758.

The propylene homopolymer is a polymer composed of constituent units derived from propylene.

Here, the isotactic pentad fraction represents the proportion of isotactic sequences in terms of pentad unit in a molecular chain measured using 13C-NMR, that is, the fraction of the constituent unit derived from propylene present in the center of a sequence of five constituent units derived from propylene meso-bonded in series. Specifically, the value is calculated as the fraction of a [mmmm] peak occupying in all the absorption peaks in a methyl-carbon region observed on a 13C-NMR spectrum. Here, the [mmmm] peak is a peak derived from propylene present in the center of a chain of five constituent units meso-bonded in series.

This [mmmm] can be determined by the method described in the report of A. Zambelli et al. (Macromolecules, 1973, No. 6).

[mmmm] of the component A1 is preferably 0.95 or more, more preferably 0.96 or more, and even more preferably 0.97 or more.

The melt mass flow rate of the component A1 measured under conditions of a temperature of 230° C. and a load of 2.16 kgf is preferably 0.1 g/10 minutes or more and 2 g/10 minutes or less, more preferably 0.2 g/10 minutes or more and 1.5 g/10 minutes or less, and even more preferably 0.3 g/10 minutes or more and 1.0 g/10 minutes or less. The smaller the value of the melt mass flow rate described above of the component A1, the more excellent the elastic bending strength of the member for an automobile roof tends to be.

The melting point of the component A1 determined by differential scanning calorimetry (hereinbelow, denoted as DSC) is preferably 150° C. or more, more preferably 155° C. or more, and even more preferably 160° C. or more. The amount of heat of fusion of the component A1 determined by DSC is preferably 60 J/g or more, more preferably 80 J/g or more, and even more preferably 90 J/g or more.

The melting point of the component A1 is the melting temperature of the crystalline phase contained in the component A1. Specifically, the melting point is the peak top temperature in the endothermic peak on the highest temperature side on a DSC curve obtained on raising the temperature of the component A1.

The amount of heat of fusion of the component A1 is an amount of heat required for transition of the crystalline phase contained in the component A1 to a molten state. Specifically, the amount of heat of fusion is determined as the total peak area of all the endothermic peaks on the DSC curve obtained on raising the temperature of the component A1.

The melting point and the amount of heat of fusion of the component A1 are measured using DSC under the following conditions. (i) About 10 mg of the component A1 is heat-treated under a nitrogen atmosphere at 220° C. for five minutes and then cooled to 50° C. at a temperature lowering rate of 5° C./minute. (ii) Subsequently, the component A1 is maintained at 50° C. for one minute and heated from 50° C. to 180° C. at a temperature rising rate of 5° C./minute.

The component A1 can be produced by a known polymerization method using a catalyst system formed by bringing a known solid titanium catalyst component, an organic metal compound catalyst component, and furthermore an electron donor, as required, into contact with one another; a catalyst system formed by bringing a compound of a transition metal of group 4 of the periodic table having a cyclopentadienyl ring and an alkylaluminoxane into contact with each other; a catalyst system formed by bringing a compound of a transition metal of group 4 of the periodic table having a cyclopentadienyl ring, a compound forming an ionic complex by a reaction with the transition metal compound, and an organoaluminum compound into contact with one another, or the like.

The component A2 is an ethylene-methyl methacrylate copolymer component having a melt mass flow rate of 1.5 g/10 minutes or more and 5.0 g/10 minutes or less, measured under conditions of a temperature of 190° C. and a load of 2.16 kgf. The ethylene-methyl methacrylate copolymer component is a copolymer containing 15% by weight or more and 20% by weight or less of a constituent unit derived from methyl methacrylate (also referred to as a "methyl methacrylate unit") and containing 80% by weight or more and 85% by weight or less of a constituent unit derived from ethylene (also referred to as an "ethylene unit"). One component A2 may be used singly or two or more components A2 may be used in combination.

The content of the methyl methacrylate unit in the ethylene-methyl methacrylate copolymer component can be determined by producing a press sheet having a thickness of 0.3 mm and measuring the press sheet using an infrared spectrometer by an infrared absorption spectrometry method. A peak at 3448 $cm^{-1}$ attributed to methyl methacrylate is used as the characteristic absorption of the infrared absorption spectrum, and the absorbance is corrected with the thickness in accordance with the following expression to determine the content of the methyl methacrylate unit:

$$MMA = 4.1 \times \log(I_0/I)/t - 5.3$$

wherein MMA represents the content of the methyl methacrylate unit (% by weight), I represents the intensity of transmitted light at a frequency of 3448 $cm^{-1}$, $I_0$ represents the intensity of incident light at a frequency of 3448 $cm^{-1}$, and t represents the thickness of a sample sheet to be measured (cm).

The content of the ethylene unit in the ethylene-methyl methacrylate copolymer component is calculated by subtracting the content of the methyl methacrylate unit from 100% by weight, for example.

The melt mass flow rate of the component A2 measured under conditions of a temperature of 190° C. and a load of 2.16 kgf is preferably 1.8 g/10 minutes or more and 3 g/10 minutes or less, more preferably 1.9 g/10 minutes or more and 2.2 g/10 minutes or less, and even more preferably 1.95 g/10 minutes or more and 2.1 g/10 minutes or less, from the viewpoint of coatability.

The component A2 can be produced by polymerizing ethylene and methyl methacrylate using a polymerization catalyst. Examples of the polymerization catalyst include catalysts described in Japanese Unexamined Patent Publications Nos. S61-176617, S61-179210, and H6-16726 and a metallocene catalyst including rare earth metals described in Japanese Unexamined Patent Publication No. H3-263412.

In the component A2, the content of the methyl methacrylate unit may be 16% by weight or more, may be 17% by weight or more, or may be 18% by weight or more.

In the component A2, the content of the ethylene unit may be 84% by weight or less, may be 83% by weight or less, or may be 82% by weight or less.

As the component A2, a commercially available product may be used. Examples of a commercially available component A2 include Acryft WH102 (manufactured by Sumitomo Chemical Co., Ltd., trade name).

The component A3 is an ethylene-(1-butene) copolymer component having a melt mass flow rate of 0.1 g/10 minutes or more and 1.0 g/10 minutes or less, measured under conditions of a temperature of 190° C. and a load of 2.16 kgf Here, the ethylene-(1-butene) copolymer component is a copolymer containing 10% by weight or more and 40% by weight or less of a constituent unit derived from 1-butene (also referred to as "1-butene unit") and containing 60% by weight or more and 90% by weight or less of a constituent unit derived from ethylene. One component A3 may be used singly or two or more components A3 may be used in combination.

The content of the ethylene unit in the ethylene-(1-butene) copolymer component can be determined from a 13C-NMR spectrum measured under the following conditions in accordance with the report of Kakugo et al. (Macromolecules, 1982, 15, 1150-1152).

A sample is prepared by homogeneously dissolving about 200 mg of the ethylene-(1-butene)copolymer in 3 ml of orthodichlorobenzene in a test tube having a diameter of 10 mm. A 13C-NMR spectrum of the sample was measured under conditions of a measurement temperature of 135° C., a pulse repetition time of 10 seconds, a pulse width of 45°, and a cumulative number of 2500.

The content of the 1-butene unit in the ethylene-(1-butene) copolymer component is calculated by subtracting the content of the ethylene unit from 100% by weight, for example.

The melt mass flow rate of the component A3 measured under conditions of a temperature of 190° C. and a load of 2.16 kgf may be 0.1 g/10 minutes or more, may be 0.2 g/10 minutes or more, or may be 0.3 g/10 minutes or more, from the viewpoint of coatability.

The component A3 can be produced by polymerizing ethylene and 1-butene using a polymerization catalyst. Examples of the polymerization catalyst include catalyst systems composed of a vanadium compound and an organoaluminum compound, Ziegler-Natta catalyst systems, and metallocene catalyst systems. Examples of the polymerization method include solution polymerization methods, slurry polymerization methods, high pressure ion polymerization methods, and gas phase polymerization methods.

In the component A3, the content of 1-butene unit may be 15% by weight or more and 35% by weight or less, may be 15.5% by weight or more and 32.5% by weight or less, or may be 20% by weight or more and 30% by weight or less.

In the component A3, the content of the ethylene unit may be 65% by weight or more and 85% by weight or less, may be 67.5% by weight or more and 82.5% by weight or less, or may be 70% by weight or more and 80% by weight or less.

As the component A3, a commercially available product may be used. Examples of commercially available components A3 include ENGAGE ENR7447 (manufactured by Dow DuPont Elastomers, trade name) and Tafmer A0250 (manufactured by Mitsui Chemicals, Inc., trade name).

In the layer A-a and the layer A-b, the content of the component A1 may be 43% by weight or more, 43.5% by weight or more, or 44% by weight or more and may be 47% by weight or less, 46.5% by weight or less, or 46% by weight or less. In the layer A-a and the layer A-b, the content of the component A2 may be 33% by weight or more, 33.5% by weight or more, or 34% by weight or more and may be 37% by weight or less, 36.5% by weight or less, or 36% by weight or less. In the layer A-a and the layer A-b, the content of the component A3 may be 15.5% by weight or more, 15% by weight or more, or 14.5% by weight or more and may be 24.5% by weight or less, 24% by weight or less, or 23.5% by weight or less. Note that the total content of the component A1, the component A2, and the component A3 is assumed to be 100% by weight.

The component A1, the component A2, and the component A3 contained in the layer A-a are respectively the same as the component A1, the component A2, and the component A3 contained in the layer A-b.

[Layer B]

The layer B is a layer containing a propylene polymer component (B1) (hereinbelow, also referred to as the "component B1") and a talc (B2) (hereinbelow, also referred to as the "component B2"), wherein, when the total content of the component B1 and the component B2 is assumed to correspond to 100% by weight, the content of the component B1 is 65% by weight or more and 75% by weight or less, and the content of the component B2 is 25% by weight or more and 35% by weight or less.

As the component B1, it is possible to use a component similar to the component A1 contained in the layer A-a and the layer A-b.

The component B2 is a talc satisfying all of the following requirement (1-a), the following requirement (1-b), and the following requirement (1-c).

Requirement (1-a):
a talc having a median diameter D50(L) of 10 μm or more and 25 μm or less, measured by a laser diffraction method in accordance with JIS R1629;

Requirement (1-b): a talc having a median diameter D50(S) of 2 μm or more and 8 μm or less, measured by a centrifugal sedimentation method in accordance with JIS R1619, and Requirement (1-c):
a talc having an aspect ratio constant of 2 or more and 15 or less, determined by the following expression (1):

$$\text{Aspect ratio constant} = \{D50(L) - D50(S)\}/D50(S) \quad \text{Expression (1)}.$$

One component B2 may be used singly or two or more components B2 may be used in combination.

(Median Diameter D50(L) Measured by Laser Diffraction Method)

Measurement is performed using a laser-method particle size distribution analyzer in accordance with JIS R1629, and the median diameter D50(L) can be determined from the particle size value at the cumulative amount of 50% by weight read on the obtained cumulative particle size distribution curve. An example of the laser-method particle size distribution analyzer is MT-3300EX-II manufactured by Nikkiso Co., Ltd.

The median diameter D50(L) of the component B2 measured by the laser diffraction method in accordance with HIS R1629 may be 22 μm or less, may be 20 μm or less, or may be 18 μm or less, from the viewpoint of the impact resistance of a member for an automobile roof.

(Median Diameter D50(S) Measured by Centrifugal Sedimentation Method)

Measurement is performed using a centrifugal sedimentation-type particle size distribution analyzer in accordance with JIS R1619, and the median diameter D50(S) can be determined from the particle size value at the cumulative amount of 50% by weight read on the obtained cumulative particle size distribution curve. An example of the centrifugal sedimentation-type particle size distribution analyzer is SA-CP3 manufactured by SHIMADZU CORPORATION.

The median diameter D50(S) of the component B2 measured by a centrifugal sedimentation method in accordance with JIS R1629 may be 6 μm or less, may be 5 μm or less, or may be 4 μm or less.

(Aspect Ratio Constant)

The aspect ratio constant can be determined from the values of the median diameter D50(L) and the median diameter D50(S) described above by the expression (1) described above. The aspect ratio constant of the component B2 may be 2.1 or more and 10 or less, may be 2.2 or more and 9 or less, or may be 2.3 or more and 8 or less.

The content of the component B1 contained in the layer B is preferably 66% by weight or more and 74% by weight or less, more preferably 67% by weight or more and 73% by weight or less, and even more preferably 68% by weight or more and 72% by weight or less. The content of the component B2 contained in the layer B is preferably 26% by weight or more and 34% by weight or less, more preferably 27% by weight or more and 33% by weight or less, and even more preferably 28% by weight or more and 32% by weight or less. Note that the total content of the component B1 and the component B2 is assumed to be 100% by weight.

Examples of a method for mixing each component constituting the layer A-a, the layer A-b, and the layer B include a method for melt-kneading each component in a kneader such as a single-screw extruder, a twin-screw extruder, a Banbury mixer, or a heat roll and a method for mixing each component during a polymerization reaction for producing the component A1, component A2, the component A3 or the component B1.

Examples of a method for producing the layer A-a, the layer A-b, and layer B include a press molding method, an extrusion method, and an injection molding method.

[Laminate for Compression Molding]

A laminate for compression molding according to the present embodiment is a laminate including one layer A-a, one layer A-b, and one layer B. In the laminate for compression molding, the layer A-a is disposed so as to form one surface of the laminate, and the layer A-b is disposed so as to form the surface of the laminate on which the layer A-a is not disposed.

The laminate for compression molding of the present embodiment is a laminate in which, when the sum of the thickness of the layer A-a, the thickness of the layer B, and the thickness of the layer A-b is assumed to account for 100%, the sum of the thickness of the layer A-a and the thickness of the layer A-b accounts for 6% or more and 8% or less, and the thickness of the layer A-a accounts for 0.5% or more and 7.5% or less, the thickness of the layer A-b accounts for 0.5% or more and 7.5% or less, and the thickness of the layer B accounts for 92% or more and 94% or less.

In the laminate for compression molding described above, the thickness of the layer A-a may correspond to 1% or more and 7% or less, may correspond to 2% or more and 6% or less, or may correspond to 3% or more and 5% or less, from the viewpoint of an amount of deformation by heating. In the laminate for compression molding described above, the thickness of the layer A-b may correspond to 1% or more and 7% or less, may correspond to 2% or more and 6% or less, or may correspond to 3% or more and 5% or less, from the viewpoint of an amount of deformation by heating. In the laminate for compression molding described above, the thickness of the layer B may correspond to 93.5% or less, may correspond to 93% or less, or may correspond to 92%, from the viewpoint of an amount of deformation by heating. Note that the sum of the thickness of the layer A-a, the thickness of the layer B, and the thickness of the layer A-b is assumed to correspond to 100%.

The laminate for compression molding may contain various additives and a crystal nucleating agent.

Examples of the additives include an antioxidant, an ultraviolet absorber, an antistatic agent, a slip agent, a pressure-sensitive adhesive, an antifog agent, and an antiblocking agent.

Examples of the crystal nucleating agent include α-crystal nucleators such as sorbitol-based nucleators, organophosphate metal salt-based compounds, organic carboxylic acid metal salt-based compounds, and rosin-based compounds; and β-crystal nucleators such as amide-based compounds and quinacridone-based compounds. The content of the crystal nucleating agent is preferably 0.001 parts by weight or more based on 100 parts by weight of the laminate for compression molding, from the viewpoint of an effect of addition, and is more preferably 1.5 parts by weight or less based on 100 parts by weight of the laminate for compression molding, in order to prevent a deterioration of the dispersibility of the crystal nucleator.

The laminate for compression molding can be produced by extruding the layer A-a, the layer A-b, and the layer B by a coextrusion method.

The member for an automobile roof according to the present embodiment can be produced by compression molding the laminate for compression molding described above (thermally compressing the laminate in the thickness direction) in such a way that the sum of the thickness of the layer A-a, the thickness of the layer B, and the thickness of the layer A-b accounts for 70% or more and 93% or less. That is, the member for an automobile roof can be obtained by compression molding the laminate for compression molding in such a way that, when the sum of the thickness of the layer A-a, the thickness of the layer B, and the thickness of the layer A-b in the laminate before compression molding (laminate for compression molding) is assumed to correspond to 100%, the sum of the thickness of the layer A-a, the thickness of the layer B, and the thickness of the layer A-b after compression molding accounts for 70% or more and 93% or less. The total thickness of the layer A-a, the layer B, and the layer A-b in the laminate after compression molding (member for an automobile roof) (%) with respect to the total thickness of the layer A-a, the layer B, and the layer A-b in the laminate before compression molding (laminate for compression molding) is also referred to as a compression ratio.

In the member for an automobile roof of the present embodiment, the surface perpendicular to the thickness direction of the component B2 is preferably oriented in parallel with the direction in which each component contained in the laminate for compression molding flows during thermal compression.

The orientation state of the component B2 in the member for an automobile roof can be evaluated by measuring wide-angle X-ray scattering of the member for an automobile roof.

The orientation state of the component B2 can be quantified by means of the degree of orientation of the component B2. The degree of orientation of the component B2 can be determined using the half width of the azimuth angle intensity distribution of the lattice plane of the component B2 perpendicular to the thickness direction in a two-dimensional wide-angle X-ray scattered image by the following expression (2). Note that the scattering angle width for calculating the azimuth angle intensity distribution is assumed to be within a range of ±0.5° from the diffraction peak position derived from the lattice plane described above:

$$\text{Degree of orientation (\%)} = \{(180-hwd)/180\} \times 100 \qquad \text{Expression (2)}$$

wherein hwd represents the half width (unit: degrees) in the azimuth angle intensity distribution of the lattice plane of the component B2 perpendicular to the thickness direction.

With a higher value of the degree of orientation described above, it can be said that the surface of the component B2 is oriented in parallel with the direction in which each component contained in the laminate for compression molding flows during thermally compressing thermal compression.

The degree of orientation of the component B2 contained in the member for an automobile roof is, for example, 80% or more, and from the viewpoint of impact resistance, preferably 85% or more.

Atoms in a crystal of the component B1 are repeatedly arranged in a three-dimensional periodic manner, and in consideration of the periodicity, it is conceived that parallelepipeds having a certain structure are three-dimensionally stacked to form the crystal. Such a parallelepiped is referred to as a unit lattice. The three sides of this unit lattice are each referred to as the a-axis, b-axis, and c-axis. In a unit lattice of an α-crystal polypropylene crystal, the molecular chain direction is referred to as the c-axis, and of the two other crystal axes, the shorter axis is referred to as the a-axis, and the longer axis is referred to as the b-axis.

In the member for an automobile roof, the c-axis or a-axis of the α-crystal in the crystal structure of the component B1 is preferably oriented in parallel with the flow direction during thermal compression. When the c-axis or a-axis of the α-crystal of the component B1 is oriented in the direction in which each component contained in the laminate for compression molding flows during thermal compression, it is possible to enhance the impact strength of the member for an automobile roof.

The crystal orientation state of the component B1 can be evaluated by measuring wide-angle X-ray scattering of the member for an automobile roof.

The crystal orientation state of the component B1 can be quantified by means of the degree of crystal orientation. The degree of crystal orientation can be determined using the half width of the azimuth angle intensity distribution of the (040) plane in a two-dimensional wide-angle X-ray scattered image by the following expression (3). Note that the scattering angle width for calculating the azimuth angle intensity distribution is assumed to be within a range of ±0.5° from the diffraction peak position derived from the (040) plane described above.

$$\text{Degree of crystal orientation (\%)} = \{(180 - hw_{040})/180\} \times 100 \quad \text{Expression (3)}$$

wherein $hw_{040}$ represents the half width (unit: degrees) in the azimuth angle intensity distribution of the (040) plane in the α-crystal of the component B1.

With a higher value of the degree of crystal orientation, it can be said that the c-axis or a-axis of the α-crystal of the component B1 is oriented in parallel with the direction in which each component contained in the laminate for compression molding flows during thermal compression.

The degree of crystal orientation of the component B1 contained in the member for an automobile roof is, for example, 75% or more and preferably 80% or more.

The member for an automobile roof of the present embodiment can be produced by compression molding a laminate for compression molding at the compression ratio mentioned above. That is, a method for producing a member for an automobile roof of the present embodiment comprises a step of compression molding a laminate for compression molding in such a way that the sum of the thickness of the layer A-a, the thickness of the layer B, and the thickness of the layer A-b accounts for 70% or more and 93% or less.

The step of compression molding is, for example, a step of thermal compression at a temperature close to the melting point of the component B1.

When a laminate for compression molding is thermally-compressed, the temperature of the pressurizing portion to be in contact with the laminate for compression molding in an apparatus used for thermal compression is a temperature close to the melting point (Tm) of the component B1, preferably the melting point (Tm)–20° C. or more and the melting point (Tm+10°) C. or less, and more preferably the melting point (Tm)–10° C. or more and the melting point (Tm+5°) C. or less.

The time for thermally compressing a laminate for compression molding is preferably 15 seconds or more and 60 minutes or less, more preferably 1 minute or more and less than 30 minutes, even more preferably 10 minutes or more and less than 15 minutes, in order to make the impact resistance of the member for an automobile roof better and to prevent thermal degradation of the components contained in the laminate for compression molding.

Examples of the apparatus for thermally compressing a laminate for compression molding include press-forming apparatuses having a temperature regulation function, track belt-type hot-pressure forming apparatuses, pressurizable belt-type sealers, and rolling compression molding apparatuses. As the thermal compression method, preferable is a method for thermally compressing the laminate for compression molding in the thickness direction by a press-forming apparatus having a temperature regulation function.

From the viewpoint of a load on the apparatus on enhancing the compression ratio and the viewpoint of obtaining a member for an automobile roof of a large size, preferable is a press-forming apparatus having a temperature regulation function. By means of the forming apparatus, it is possible to easily obtain a large member for an automobile roof having a length of any of portions of more than 40 cm when viewed from the top surface.

As a method for thermally compressing a laminate for compression molding, it is also possible to apply a lubricant on the pressurizing portion to be in contact with the laminate for compression molding of the thermal compression apparatus. Examples of the lubricant include silicone oils. Application of the lubricant reduces frictional resistance between the laminate for compression molding and the pressurizing portion to enable smoother thermal compression of the laminate for compression molding, leading to an improvement of the forming cycle and a reduction in the load on the apparatus for thermal compression.

The member for an automobile roof of the present embodiment has excellent coatability. Such a member for an automobile roof has low heat-deformability, excellent impact resistance, and high elastic bending strength. According to the method for producing a member for an automobile roof of the present invention, it is possible to produce a member for an automobile roof having excellent coatability. Additionally, according to the method for producing a member for an automobile roof of the present invention, the load on the apparatus for compression molding is reduced.

EXAMPLES

Hereinbelow, the present invention will be described with reference to Examples and Comparative Examples. The component A1, component B1, component A2, component A3, and component B2 used in Examples and Comparative Examples are shown as follows.

(1) Component A1 and Component B1

The following propylene homopolymer was obtained by using the catalyst described in Japanese Unexamined Patent Publication No. H10-212319 and controlling the hydrogen concentration in the polymerization reactor and the polymerization temperature by a gas phase polymerization method.

(A1-1) Propylene Homopolymer (Component A1)
MFR (230° C., 2.16 kg load): 0.5 g/10 minutes
Isotactic pentad fraction: 0.977
Melting point: 163° C.
Amount of heat of fusion: 106 J/g
(B1-1) Propylene Homopolymer (Component B1)
MFR (230° C., 2.16 kg load): 0.5 g/10 minutes
Isotactic pentad fraction: 0.977
Melting point: 163° C.
Amount of heat of fusion: 106 J/g
  (2) Component A2
(A2-1) Ethylene-Methyl Methacrylate Copolymer
MFR (190° C., 2.16 kg load): 2.0 g/10 minutes
Methyl methacrylate content: 20% by weight
Ethylene content: 80% by weight
  (3) Component A3
(A3-1) Ethylene-(1-Butene) Copolymer
(Trade name) ENGAGE ENR7447: manufactured by Dow DuPont
Elastomers
MFR (190° C., 2.16 kg load): 0.5 g/10 minutes
Ethylene content: 74% by weight
1-Butene content: 26% by weight
  (4) Component B2
(B2-1) Talc
(Trade name) BAR W92: manufactured by Imerys
D50(L): 11 μm
D50(S): 2.5 μm
Aspect ratio constant: 3.4

The physical properties of the raw material components and laminated flat plate were measured in accordance with methods shown below.

(1) Melt Mass Flow Rate (MFR, Unit: g/10 Minutes)

The melt mass flow rate was measured in accordance with the method specified in JIS K6758. The melt mass flow rate was measured at a measurement temperature of 230° C. or 190° C. and under a load of 2.16 kg.

(2) Isotactic Pentad Fraction ([Mmmm])

A sample was prepared by completely dissolving about 200 mg of a resin sample in 3 ml of orthodichlorobenzene in a test tube having a diameter of 10 mm, and a 13C-NMR spectrum of the sample was measured. The measurement conditions for the 13C-NMR spectrum are shown below.

<Measurement Conditions>
Model: Bruker Avance 600
Measurement temperature: 135° C.
Pulse repetition time: 10 seconds
Pulse width: 45°
Cumulative number: 2500

[mmmm] was calculated from the measurement results in accordance with the method described in the report of A. Zambelli et al. (Macromolecules, 1973, No. 6, section 925 to section 926).

(3) Melting Point (Tm, Unit: ° C.) and Amount of Heat of Fusion (ΔH, Unit: J/g)

The propylene polymer component was hot press-formed (after the component was preheated at 230° C. for five minutes, the pressure was raised over one minute to 5.0 MPa, the raised pressure was maintained for two minutes, and then, the component was cooled at 30° C. and 5.0 MPa for five minutes) to produce a sheet having a thickness of about 0.5 mm A differential scanning calorimeter (manufactured by PerkinElmer Inc., Diamond DSC) was used to measure the melting point and the amount of heat of fusion of the propylene polymer component and thermoplastic elastomer component. The measurement results are noted below.

<Measurement Conditions>

After 10 mg of the produced sheet was heat-treated under a nitrogen atmosphere at 220° C. for five minutes, the sheet was cooled at a temperature lowering rate of 5° C./minute to 50° C., then maintained at 50° C. for one minute, and subsequently heated at a temperature rising rate of 5° C./minute from 50° C. to 180° C.

<Method for Calculating Tm and ΔHS

The peak top temperature in the endothermic peak on the highest temperature side on a DSC curve obtained on raising the temperature of the DSC was assumed to be Tm (° C.). The peak area of all the peaks derived from the endotherm on the DSC curve described above was assumed to be ΔH (J/g).

(4) Content of Constituent Unit Derived from Methyl Methacrylate and Content of Constituent Unit Derived from Ethylene in Component A2

The content of the methyl methacrylate unit in the component A2 was determined by preparing a press sheet having a thickness of 0.3 mm and measuring the press sheet using an infrared spectrometer by an infrared absorption spectrometry method. A peak at 3448 cm$^{-1}$ attributed to methyl methacrylate was used as the characteristic absorption of the infrared absorption spectrum, and the absorbance was corrected with the thickness in accordance with the following expression to determine the content of the methyl methacrylate unit:

$$MMA = 4.1 \times \log(I0/I)/t - 5.3$$

wherein MMA represents the content of the methyl methacrylate unit (% by weight), I represents the intensity of the transmitted light at a frequency of 3448 cm$^{-1}$, I0 represents the intensity of incident light at a frequency of 3448 cm$^{-1}$, and t represents the thickness of a sample sheet to be measured (cm).

The content of the ethylene unit of the component A2 was calculated by subtracting the content of the methyl methacrylate unit from 100% by weight.

(5) Content of Constituent Unit Derived from Ethylene and Content of Constituent Unit Derived from 1-Butene in Component 3

A sample was prepared by completely dissolving about 200 mg of a resin sample in 3 ml of orthodichlorobenzene in a test tube having a diameter of 10 mm, and a 13C-NMR spectrum of the sample was measured. The measurement conditions for the 13C-NMR spectrum are shown below.

<Measurement Conditions>
Model: Bruker Avance 600
Measurement temperature: 135° C.
Pulse repetition time: 10 seconds
Pulse width: 45°
Cumulative number: 2500

From the measurement results, the content of the constituent unit derived from ethylene was calculated in accordance with the method described in the report of M. Kakugo et al. (Macromolecules, 1982, No. 15, section 1150 to section 1152), and the content of the constituent unit derived from 1-butene was calculated by subtracting the content of the constituent unit derived from ethylene from 100% by weight.

(6) Median Diameter D50(L) Measured by Laser Diffraction Method

The median diameter D50(L) measured by a laser diffraction method was determined by the following method. A sample dispersed in ethanol using a homogenizer was measured using a Microtrac particle size analyzer ("MT-3300EX II" manufactured by Nikkiso Co., Ltd.) in accordance with MS R1629, and D50(L) was determined from the particle size value at the cumulative amount of 50% by weight read on the obtained cumulative particle size distribution curve.

(7) Median Diameter D50(S) Measured by Centrifugal Sedimentation Method

The median diameter D50(S) measured by a centrifugal sedimentation method was determined by the following method. A sample dispersed in ethanol using an ultrasonic cleaner was measured using a centrifugal sedimentation-type particle size distribution analyzer ("SA-CP3" manufactured by SHIMADZU CORPORATION) in accordance with JIS R1619, and D50(S) was determined from the particle size value at the cumulative amount of 50% by weight read on the obtained cumulative particle size distribution curve.

(8) Aspect Ratio Constant

The values of the median diameter D50(L) and the median diameter D50(S) described above were used to determine the aspect ratio constant by the following expression (1).

$$\text{Aspect ratio constant} = \{D50(L) - D50(S)\}/D50(S) \quad \text{Expression (1)}$$

(9) Compression Ratio

The thickness of the laminate for compression molding including the layer A-a, the layer A-b, and the layer B stacked and the thickness of the laminated flat plate after compression molding were measured with a vernier caliper, and the compression ratio was calculated in accordance with the following expression.

Compression ratio (%) = Thickness of laminated flat plate after compression molding (mm)/thickness of laminate for compression molding (mm)×100

(10) Wide-Angle X-Ray Scattering

The wide-angle X-ray scattering of the laminated flat plate was measured under the following conditions.

<Measurement Conditions>
Model: Ultra X18 manufactured by Rigaku Corporation
X-ray source: CuKα-ray
Voltage: 40 kV
Current: 200 mA
Detector: X-ray photon counting-type two-dimensional detector PILATUS
Measurement Method: Transmission Method
<Measurement Method>

The laminated flat plate described above was cut in parallel with a plane including both a first axis in the direction in which the resin composition flowed due to thermal compression on producing the laminated flat plate and a second axis in the thickness direction of the laminated flat plate orthogonal to the first axis to thereby form a cross section. A depth position in the cross section described above equidistant from either surface of the laminated flat plate described above was irradiated with an X-ray to measure the wide-angle X-ray scattering profile.

(11) Measurement of Degree of Crystal Orientation of Component B1 Contained in Laminated Flat Plate The degree of crystal orientation of the component B1 was evaluated by the following method. The wide-angle X-ray scattering profile obtained by the measurement described above was used to determine the azimuth angle intensity distribution derived from the (040) plane of the α-crystal of the component B1. The half width at the peak position was determined from the azimuth angle intensity distribution obtained, and the degree of crystal orientation was determined by the following expression (3):

$$\text{Degree of crystal orientation (\%)} = \{(180 - hw_{040})/180\} \times 100 \quad \text{Expression (3)}$$

wherein $hw_{040}$ represents the half width (unit: degrees) in the azimuth angle intensity distribution of the (040) plane of the component B1.

(12) Measurement of Degree of Orientation of Component B2 Contained in Laminated Flat Plate The degree of crystal orientation of the component B2 was evaluated by the following method. The wide-angle X-ray scattering profile obtained by the measurement described above was used to determine the azimuth angle intensity distribution derived from the lattice plane of the component B2 perpendicular to the thickness direction. The half width at the peak position was determined from the azimuth angle intensity distribution obtained, and the degree of orientation of the component B2 was determined by the following expression (2):

$$\text{Degree of orientation (\%)} = \{(180 - hwd)/180\} \times 100 \quad \text{Expression (2)}$$

wherein hwd represents the half width (unit: degrees) in the azimuth angle intensity distribution of the lattice plane of the component B2 perpendicular to the thickness direction.

(13) Elastic Bending Strength (FM, Unit: MPa)

A specimen was cut out from the laminated flat plate obtained to a size of 127 mm in length, 12.5 mm in width, and 2.5 mm in thickness. The specimen was used for measurement in accordance with the method specified in JIS-K-7203. The span length was set to 40 mm, the load rate was set to 2.0 mm/minute, and the measurement temperature was set to 23° C.

(14) Water-Resistant Adhesion
<Coating Condition (I)>

A specimen was cut out from the laminated flat plate obtained to a size of 150 mm in length, 70 mm in width, and 2.5 mm in thickness. The surface of the specimen was spray-coated (dried film thickness: 7 μm) with a primer (ASX2870CD manufactured by Kansai Paint Co., Ltd.) by a reciprocator (RIH1200H035 manufactured by CFT Ransburg), and the primer was dried at 60° C. for three minutes. Then, the primer-coated surface was spray-coated (dried film thickness: 15 μm) with an aqueous base paint (WBC-717T (#1F7) manufactured by Kansai Paint Co., Ltd.) by the reciprocator, and the paint was dried at 60° C. for three minutes. The paint-coated surface was spray-coated with a clear paint (comprising SFX7175 clear base manufactured by Kansai Paint Co., Ltd., SFXD-6200 isocyanate curing agent manufactured by Kansai Paint Co., Ltd., and UT-086 thinner manufactured by Kansai Paint Co., Ltd.) by the reciprocator. Then, the paint was dried at 120° C. for 42 minutes to form a multi-layered coated film.
<Evaluation Condition>

The specimen on which the multi-layered coated film had been formed in accordance with the coating condition (I) was immersed in a water-resistant tank at 40° C. for 240 hours. After withdrawn, the specimen was subjected within one hour to an appearance evaluation. Test pieces having an abnormal appearance such as swelling or blistering were regarded as unacceptable.

(15) Coating Peel Strength (Unit: N/10 mm)
<Coating Condition (II)>

A specimen was cut out from the laminated flat plate obtained to a size of 150 mm in length, 70 mm in width, and 2.5 mm in thickness. After masking tape having a width of 10 mm was attached to one end in the longitudinal direction of the surface of the specimen, the surface of the specimen was spray-coated (dried film thickness: 7 μm) with a primer (WB1200CD-6 manufactured by Nippon Paint Co., Ltd.) by a reciprocator (RIH1200H035 manufactured by CFT Ransburg), and the primer was dried at 60° C. for three minutes. Thereafter, the primer-coated surface was spray-coated with a base paint (R-278 base manufactured by Nippon Paint Co., Ltd. and R-271 curing agent manufactured by Nippon Paint Co., Ltd.) by the reciprocator. Then, the paint was dried at 120° C. for 20 minutes to form a multi-layered coated film.
<Evaluation Condition>

In the specimen on which the multi-layered coated film had been formed in accordance with the coating condition (II), an incision having a width of 10 mm and a length of 100 mm was made on the multi-layered coated film. The point at which the masking tape having a width of 10 mm had been attached, which point was the end in the longitudinal direction of the surface of the specimen, was pulled at an angle of 180° and at a speed of 50 mm/minute, and stresses when 10 mm of the multi-layered coated film was peeled off were averaged to obtain the coating peel strength.

Example 1

(Production of Layer A-a)

45% by weight of a propylene homopolymer (A1-1), 35% by weight of an ethylene-methyl methacrylate copolymer component (A2-1), and 20% by weight of an ethylene-(1-butene) copolymer component (A3-1) were mixed. The mixture was melt-kneaded using a 40-mm single-screw extruder VS40-28 model (manufactured by TANABE PLASTICS MACHINERY CO., LTD.) under conditions of a cylinder setting temperature: 220° C. and a number of screw revolutions: 70 rpm to obtain a resin composition (a-1). The obtained resin composition (a-1) was compression-molded using a compression-molding apparatus (P-37) manufactured by Shinto Metal Industries, Ltd. under conditions of a temperature of 230° C., a pressure on pressurization of 10 MPa, and 10 minutes to obtain a layer A-a having a width of 15 cm, a length of 15 cm, and a thickness of 0.108 mm. Table 1 shows the type and content of the components in the layer A-a.

(Production of Layer A-b)

45% by weight of a propylene homopolymer (A1-1), 35% by weight of an ethylene-methyl methacrylate copolymer component (A2-1), and 20% by weight of an ethylene-(1-butene) copolymer component (A3-1) were mixed. The mixture was melt-kneaded using a 40-mm single-screw extruder VS40-28 model (manufactured by TANABE PLASTICS MACHINERY CO., LTD.) under conditions of a cylinder setting temperature: 220° C. and a number of screw revolutions: 70 rpm to obtain a resin composition (b-1). The obtained resin composition (b-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer A-b having a width of 15 cm, a length of 15 cm, and a thickness of 0.108 mm. Table 1 shows the type and content of the components in the layer A-b.

(Production of Layer B)

70% by weight of a propylene homopolymer (B1-1) and 30% by weight of a talc (B2-1) were mixed. The mixture was melt-kneaded using a 15 mm twin-screw extruder KZW15-45MG (manufactured by TECHNOVEL CORPORATION) under conditions of a cylinder setting temperature: 220° C., a number of screw revolutions: 5100 rpm, and a throughput: about 4 kg/hour to obtain a resin composition (c-1). The obtained resin composition (c-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer B having a width of 15 cm, a length of 15 cm, and a thickness of 2.48 mm. Table 1 shows the type and content of the components in the layer B.

(Production of Laminate for Compression Molding)

One layer B was laminated on the upper surface of the layer A-a described above and one layer A-b was further laminated on the layer B to produce a laminate for compression molding (d-1), in which three layers: the layer A-a, the layer B, and the layer A-b were laminated in the order mentioned. Table 1 shows the proportion of the thickness of the layer A-a, the layer B, and the layer A-b in the laminate for compression molding.

(Production of Laminated Flat Plate)

The laminate for compression molding (d-1) described above was placed in a hot press-forming apparatus of which press plate was set at 160° C., and the pressure was raised to 100 t and maintained for five minutes. After cooling to 80° C. with the pressure maintained, the apparatus was depressurized to obtain a laminated flat plate having a thickness of 2.5 mm Table 2 shows the physical properties of the laminated flat plates obtained.

Example 2

(Production of Layer A-a)

45% by weight of a propylene homopolymer (A1-1), 35% by weight of an ethylene-methyl methacrylate copolymer component (A2-1), and 20% by weight of an ethylene-(1-butene) copolymer component (A3-1) were mixed. The mixture was melt-kneaded using a 40-mm single-screw extruder VS40-28 model (manufactured by TANABE PLASTICS MACHINERY CO., LTD.) under conditions of a cylinder setting temperature: 220° C. and a number of screw revolutions: 70 rpm to obtain a resin composition (a-1). The obtained resin composition (a-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer A-a having a width of 15 cm, a length of 15 cm, and a thickness of 0.14 mm. Table 1 shows the type and content of the components in the layer A-a.

(Production of Layer A-b)

45% by weight of a propylene homopolymer (A1-1), 35% by weight of an ethylene-methyl methacrylate copolymer component (A2-1), and 20% by weight of an ethylene-(1-butene) copolymer component (A3-1) were mixed. The mixture was melt-kneaded using a 40-mm single-screw extruder VS40-28 model (manufactured by TANABE PLASTICS MACHINERY CO., LTD.) under conditions of a cylinder setting temperature: 220° C. and a number of screw revolutions: 70 rpm to obtain a resin composition (b-1). The obtained resin composition (b-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer A-b having a width of 15 cm, a length of 15 cm, and a thickness of 0.14 mm. Table 1 shows the type and content of the components in the layer A-b.

(Production of Layer B)

70% by weight of a propylene homopolymer (B1-1) and 30% by weight of a talc (B2-1) were mixed. The mixture was melt-kneaded using a 15 mm twin-screw extruder KZW15-45MG (manufactured by TECHNOVEL CORPORATION) under conditions of a cylinder setting temperature: 220° C., a number of screw revolutions: 5100 rpm, and a throughput: about 4 kg/hour to obtain a resin composition (c-1). The obtained resin composition (c-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer B having a width of 15 cm, a length of 15 cm, and a thickness of 3.42 mm. Table 1 shows the type and content of the components in the layer B.

(Production of Laminate for Compression Molding)

One layer B was laminated on the upper surface of the layer A-a described above and one layer A-b was further laminated on the layer B to produce a laminate for compression molding (d-2), in which three layers: the layer A-a, the layer B, and the layer A-b were laminated in the order mentioned. Table 1 shows the proportion of the thickness of the layer A-a, the layer B, and the layer A-b in the laminate for compression molding.

(Production of Laminated Flat Plate)

The laminate for compression molding (d-2) described above was placed in a hot press-forming apparatus of which press plate was set at 160° C., and the pressure was raised to 100 t and maintained for five minutes. After cooling to 80° C. with the pressure maintained, the apparatus was depressurized to obtain a laminated flat plate having a thickness of 2.5 mm. Table 2 shows the physical properties of the laminated flat plates obtained.

Comparative Example 1

(Production of Layer A-a)

45% by weight of a propylene homopolymer (A1-1), 35% by weight of an ethylene-methyl methacrylate copolymer component (A2-1), and 20% by weight of an ethylene-(1-butene) copolymer component (A3-1) were mixed. The mixture was melt-kneaded using a 40-mm single-screw extruder VS40-28 model (manufactured by TANABE PLASTICS MACHINERY CO., LTD.) under conditions of a cylinder setting temperature: 220° C. and a number of screw revolutions: 70 rpm to obtain a resin composition (a-1). The obtained resin composition (a-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer A-a having a width of 15 cm, a length of 15 cm, and a thickness of 0.20 mm. Table 1 shows the type and content of the components in the layer A-a.

(Production of Layer A-b)

45% by weight of a propylene homopolymer (A1-1), 35% by weight of an ethylene-methyl methacrylate copolymer component (A2-1), and 20% by weight of an ethylene-(1-butene) copolymer component (A3-1) were mixed. The mixture was melt-kneaded using a 40-mm single-screw extruder VS40-28 model (manufactured by TANABE PLASTICS MACHINERY CO., LTD.) under conditions of a cylinder setting temperature: 220° C. and a number of screw revolutions: 70 rpm to obtain a resin composition (b-1). The obtained resin composition (b-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer A-b having a width of 15 cm, a length of 15 cm, and a thickness of 0.20 mm. Table 1 shows the type and content of the components in the layer A-b.

(Production of Layer B)

70% by weight of a propylene homopolymer (B1-1) and 30% by weight of a talc (B2-1) were mixed. The mixture was melt-kneaded using a 15 mm twin-screw extruder KZW15-45MG (manufactured by TECHNOVEL CORPORATION) under conditions of a cylinder setting temperature: 220° C., a number of screw revolutions: 5100 rpm, and a throughput: about 4 kg/hour to obtain a resin composition (c-1). The obtained resin composition (c-1) was compression-molded using a compression-molding apparatus (P-37) manufactured by Shinto Metal Industries, Ltd. under conditions of a temperature of 230° C., a pressure on pressurizing of 10 MPa, and 10 minutes to obtain a layer B having a width of 15 cm, a length of 15 cm, and a thickness of 4.6 mm Table 1 shows the type and content of the components in the layer B.

(Production of Laminate for Compression Molding)

One layer B was laminated on the upper surface of the layer A-a described above and one layer A-b was further laminated on the layer B to produce a laminate for compression molding (d-3), in which three layers: the layer A-a, the layer B, and the layer A-b were laminated in the order mentioned. Table 1 shows the proportion of the thickness of the layer A-a, the layer B, and the layer A-b in the laminate for compression molding.

(Production of Laminated Flat Plate)

The laminate for compression molding (d-3) described above was placed in a hot press-forming apparatus of which press plate was set at 160° C., the pressure was raised to 100 t, which was maintained for five minutes. After cooling to 80° C. with the pressure maintained, the apparatus was depressurized to obtain a laminated flat plate having a thickness of 2.5 mm. Table 2 shows the physical properties of the laminated flat plates obtained.

TABLE 1

| | | Component | | | | | | | Proportion of thickness of layer (%) |
| | | (A1)(B1) | | (A2) | | (A3) | | (B2) | |
| | Layer | Type | % by weight | Type | % by weight | Type | % by weight | Type | % by weight | |
|---|---|---|---|---|---|---|---|---|---|---|
| Example 1 | A-a | A1-1 | 45 | A2-1 | 35 | A3-1 | 20 | — | — | 4 |
| | A-b | A1-1 | 45 | A2-1 | 35 | A3-1 | 20 | — | — | 4 |
| | B | B1-1 | 70 | — | — | — | — | B2-1 | 30 | 92 |
| Example 2 | A-a | A1-1 | 45 | A2-1 | 35 | A3-1 | 20 | — | — | 4 |
| | A-b | A1-1 | 45 | A2-1 | 35 | A3-1 | 20 | — | — | 4 |
| | B | B1-1 | 70 | — | — | — | — | B2-1 | 30 | 92 |
| Comparative Example 1 | A-a | A1-1 | 45 | A2-1 | 35 | A3-1 | 20 | — | — | 4 |
| | A-b | A1-1 | 45 | A2-1 | 35 | A3-1 | 20 | — | — | 4 |
| | B | B1-1 | 70 | — | — | — | — | B2-1 | 30 | 92 |

TABLE 2

| | Compression ratio (%) | Degree of crystal orientation of component B1 (%) | Degree of orientation of component B2 (%) | FM (MPa) | Water-resistant adhesion | Coating peel strength (N/10 mm) |
|---|---|---|---|---|---|---|
| Example 1 | 92.7 | 87 | 94 | 4731 | Accepted | 9.6 |
| Example 2 | 71.4 | 85 | 93 | 5035 | Accepted | 10.1 |
| Comparative Example 1 | 50.0 | 79 | 83 | 5200 | Unaccepted | 5.9 |

From Table 2, it can be seen that the laminated flat plates according to Examples have excellent water-resistant adhesion and coating peel strength, that is, excellent coatability. In other words, it has been confirmed that the member for an automobile roof of the present embodiment has excellent coatability.

REFERENCE SIGNS LIST

10a: Layer A-a, 10b: Layer A-b, 20: Layer B, 100: Laminate, 200: Member for an automobile roof

What is claimed is:

1. A member for an automobile roof, provided by compression molding a laminate, wherein
the laminate comprises three layers: layer A-a having a thickness, layer B having a thickness, and layer A-b having a thickness, the three layers laminated in the order mentioned, wherein a first sum of the thicknesses of the layer A-a, the layer B, and the layer A-b is 100%,
a sum of the thickness of the layer A-a and the thickness of the layer A-b accounts for 6% or more and 8% or less, and the thickness of the layer A-a accounts for 0.5% or more and 7.5% or less, the thickness of the layer A-b accounts for 0.5% or more and 7.5% or less, and the thickness of the layer B accounts for 92% or more and 94% or less,
in such a way that a second sum of the thickness of the layer A-a, the thickness of the layer B, and the thickness of the layer A-b is 70% or more and 93% or less of the first sum:
wherein each layer A-a and layer A-b comprise a propylene polymer component (A1), an ethylene-methyl methacrylate copolymer component (A2), and an ethylene-(1-butene) copolymer component (A3), each having a content and the sum of the content of the component A1, the content of the component A2, and the content of the component A3 is 100% by weight;
the content of the component (A1) is 42.5% by weight or more and 47.5% by weight or less, the content of the component (A2) is 32.5% by weight or more and 37.5% by weight or less, and the content of the component (A3) is 15% by weight or more and 25% by weight or less;
wherein the component (A1)
is a propylene homopolymer having an isotactic structure with an isotactic pentad fraction of 0.90 or more and 0.99 or less, measured using 13C-NMR, and
has a melt mass flow rate of 0.1 g/10 minutes or more and 5.0 g/10 minutes or less, measured under conditions of a temperature of 230° C. and a load of 2.16 kgf;
wherein the component (A2)
has a melt mass flow rate of 1.5 g/10 minutes or more and 5.0 g/10 minutes or less, measured under conditions of a temperature of 190° C. and a load of 2.16 kgf;
wherein the component (A3) has a melt mass flow rate of 0.1 g/10 minutes or more and 1.0 g/10 minutes or less, measured under conditions of a temperature of 190° C. and a load of 2.16 kgf;
wherein the layer B comprises a propylene polymer component (B1) and a talc (B2), each having a content and the sum of the content of the component (B1) and the content of the talc (B2) is 100% by weight;
the content of the component (B1) is 65% by weight or more and 75% by weight or less, and the content of the talc (B2) is 25% by weight or more and 35% by weight or less;
wherein the component (B1) is a propylene homopolymer having an isotactic structure
with an isotactic pentad fraction of 0.90 or more and 0.99 or less, measured using 13C-NMR, and
a melt mass flow rate of 0.1 g/10 minutes or more and 5.0 g/10 minutes or less, measured under conditions of a temperature of 230° C. and a load of 2.16 kgf;
wherein the talc (B2) satisfies:
Requirement (1-a): the talc (B2) has a median diameter $D50(L)$ of 10 μm or more and 25 μm or less, measured by a laser diffraction method in accordance with MS R1629;
Requirement (1-b): the talc (B2) has a median diameter $D50(S)$ of 2 μm or more and 8 μm or less, measured by a centrifugal sedimentation method in accordance with HS R1619; and
Requirement (1-c): the talc (B2) has an aspect ratio constant of 2 or more and 15 or less, determined by expression (1):

$$\text{Aspect ratio constant} = \{D50(L) - D50(S)\}/D50(S) \quad \text{Expression (1)}.$$

2. A method for producing member for an automobile roof, comprising a step of compression molding a laminate, wherein
the laminate comprises three layers: layer A-a having a thickness, layer B having a thickness, and layer A-b having a thickness, the three layers laminated in the order mentioned, wherein a first sum of the thicknesses of the layer A-a, the layer B, and the layer A-b is 100%,
a sum of the thickness of the layer A-a and the thickness of the layer A-b accounts for 6% or more and 8% or less, and the thickness of the layer A-a accounts for 0.5% or more and 7.5% or less, the thickness of the layer A-b accounts for 0.5% or more and 7.5% or less, and the thickness of the layer B accounts for 92% or more and 94% or less,
in such a way that a second sum of the thickness of the layer A-a, the thickness of the layer B, and the thickness of the layer A-b is 70% or more and 93% or less of the first sum:
wherein each layer A-a and layer A-b comprise a propylene polymer component (A1), an ethylene-methyl methacrylate copolymer component (A2), and an ethylene-(1-butene) copolymer component (A3), each having a content and the sum of the content of the component A1, the content of the component A2, and the content of the component A3 is 100% by weight;
the content of the component (A1) is 42.5% by weight or more and 47.5% by weight or less, the content of the component (A2) is 32.5% by weight or more and 37.5% by weight or less, and the content of the component (A3) is 15% by weight or more and 25% by weight or less;
wherein the component (A1)
is a propylene homopolymer having an isotactic structure with an isotactic pentad fraction of 0.90 or more and 0.99 or less, measured using 13C-NMR, and
has a melt mass flow rate of 0.1 g/10 minutes or more and 5.0 g/10 minutes or less, measured under conditions of a temperature of 230° C. and a load of 2.16 kgf;
wherein the component (A2)
has a melt mass flow rate of 1.5 g/10 minutes or more and 5.0 g/10 minutes or less, measured under conditions of a temperature of 190° C. and a load of 2.16 kgf;

wherein the component (A3) has a melt mass flow rate of 0.1 g/10 minutes or more and 1.0 g/10 minutes or less, measured under conditions of a temperature of 190° C. and a load of 2.16 kgf;

wherein the layer B comprises a propylene polymer component (B1) and a talc (B2), each having a content and the sum of the content of the component (B1) and the content of the talc (B2) is 100% by weight;

the content of the component (B1) is 65% by weight or more and 75% by weight or less, and the content of the talc (B2) is 25% by weight or more and 35% by weight or less;

wherein the component (B1) is a propylene homopolymer having an isotactic structure with an isotactic pentad fraction of 0.90 or more and 0.99 or less, measured using 13C-NMR, and a melt mass flow rate of 0.1 g/10 minutes or more and 5.0 g/10 minutes or less, measured under conditions of a temperature of 230° C. and a load of 2.16 kgf;

wherein the talc (B2) satisfies:

Requirement (1-a): the talc (B2) has a median diameter D50(L) of 10 μm or more and 25 μm or less, measured by a laser diffraction method in accordance with MS R1629;

Requirement (1-b): the talc (B2) has a median diameter D50(S) of 2 μm or more and 8 μm or less, measured by a centrifugal sedimentation method in accordance with HS R1619; and Requirement (1-c): the talc (B2) has an aspect ratio constant of 2 or more and 15 or less, determined by expression (1):

$$\text{Aspect ratio constant} = \{D50(L) - D50(S)\}/D50(S) \quad \text{Expression (1).}$$

* * * * *